US011222235B2

(12) United States Patent
Zhang (10) Patent No.: US 11,222,235 B2
(45) Date of Patent: Jan. 11, 2022

(54) METHOD AND APPARATUS FOR TRAINING IMAGE PROCESSING MODEL, AND STORAGE MEDIUM

(71) Applicant: Beijing Xiaomi Intelligent Technology Co., Ltd., Beijing (CN)

(72) Inventor: Liang Zhang, Beijing (CN)

(73) Assignee: Beijing Xiaomi Intelligent Technology Co., Ltd., Beijing (CN)

(*) Notice: Subject to any disclaimer, the term of this patent is extended or adjusted under 35 U.S.C. 154(b) by 89 days.

(21) Appl. No.: 16/742,321

(22) Filed: Jan. 14, 2020

(65) Prior Publication Data

US 2021/0133499 A1     May 6, 2021

(51) Int. Cl.
*G06K 9/62* (2006.01)
*G06K 9/42* (2006.01)

(52) U.S. Cl.
CPC ............ *G06K 9/6256* (2013.01); *G06K 9/42* (2013.01); *G06K 9/6262* (2013.01)

(58) Field of Classification Search
CPC ...... G06K 9/6256; G06K 9/42; G06K 9/6262; G06K 9/6259; G06N 3/0454; G06N 3/08; G06T 2207/20084; G06T 2207/20081; G06T 3/4053; G06T 5/001; G06T 2207/10004

See application file for complete search history.

(56) References Cited

U.S. PATENT DOCUMENTS

2008/0239350 A1* 10/2008 Ohira ................. H04N 1/40
                                                            358/1.9
2020/0334789 A1* 10/2020 Zhang ............... G06T 3/4046

FOREIGN PATENT DOCUMENTS

| CN | 111131688      | * 10/2018 |
| JP | 2017021787 A   |   1/2017  |
| JP | 2018195069 A   |  12/2018  |
| WO | WO 2019104705 A1 | 6/2019  |

OTHER PUBLICATIONS

Machine translation for CN 111131688 (Year: 2018).*
Zhang, X. et al., "Zoom to Learn, Learn to Zoom", 2019 IEEE/CVF Conference on Computer Vision and Pattern Recognition (CVPR), Jun. 15, 2019, 9 pages.

(Continued)

*Primary Examiner* — Qian Yang
(74) *Attorney, Agent, or Firm* — Finnegan, Henderson, Farabow, Garrett & Dunner, L.L.P.

(57) ABSTRACT

A method for training an image processing model, includes: acquiring M frames of long-distance shot images of each of N training scenes, both N and M being positive integers greater than 1; acquiring a short-distance standard image of each training scene; for each training scene, clipping the M frames of long-distance shot images to obtain a same field of view as that of the short-distance standard image, and aligning the M frames of long-distance shot images after being clipped with the short-distance standard image; forming a training sample couple of each training scene by the M frames of long-distance shot images and the short-distance standard image after alignment, and forming a training sample set by N training sample couples corresponding to the N training scenes; and training an image processing model based on the training sample set.

18 Claims, 8 Drawing Sheets

(56) References Cited

OTHER PUBLICATIONS

Chen C. et al., "Camera Lens Super-Resolution", 2019 IEEE/CVF Conference on Computer Vision and Pattern Recognition (CVPR), Jun. 15, 2019, 9 pages.
Extended European Search Report in the European application No. 20152831.2, dated Jun. 23, 2020.
Atara Okura et al, "A Proposal of Low-resolution Character Recognition Method by Super-resolution Based on Frame Selection", IEICE Technical Report, Japan, Electronic Information, Mar. 8, 2010, vol. 109, No. 471, pp. 537-542.
Takeshi Shibata, "License Plate Image Estimation by Using Learning-Based Super Resolution", Journal of Image Electronics Society, Japan, Image Electronics Society, Mar. 30, 2015, vol. 44, No. 2, pp. 363-367.

\* cited by examiner

METHOD AND APPARATUS FOR TRAINING IMAGE PROCESSING MODEL, AND STORAGE MEDIUM

CROSS-REFERENCE TO RELATED APPLICATION

This application is based upon and claims priority to Chinese Patent Application No. 201911054263.X filed on Oct. 31, 2019, the entire contents of which are incorporated herein by reference.

TECHNICAL FIELD

The present disclosure generally relates to the technical field of image processing, and more particularly, to a method and apparatus for training an image processing model and a storage medium.

BACKGROUND

A phone or a camera generally includes a zoom function. A user may zoom in on a distant object while taking a photo, for example, on a wild animal or an athlete, as to observe the object in more details. Some smart phones are even equipped with two cameras with different zoom levels. Optical zooming is one choice for image zoom, and can maintain high image quality. However, a zoom lens generally is expensive and heavy. Therefore, digital zooming is mainly taken for image enhancement. Digital zooming can increase an area of each pixel in a picture through a processor in a mobile phone or a digital camera, as to achieve enlargement.

However, a traditional digital zooming method may just perform upward sampling on a clipping area input by a camera sensor, which may produce a fuzzy output.

SUMMARY

According to a first aspect of the embodiments of the present disclosure, a method for training an image processing model includes: for each of N training scenes, acquiring M frames of long-distance shot images, both N and M being positive integers greater than 1; for each of the N training scenes, acquiring a short-distance standard image of each of the training scene; for each of the N training scenes, clipping the M frames of long-distance shot images to obtain a same field of view as that of the short-distance standard image, and aligning the M frames of long-distance shot images after being clipped with the short-distance standard image; forming a training sample couple of each of the N training scenes by the M frames of long-distance shot images and the short-distance standard image of each of the N training scenes after alignment, and forming a training sample set by N training sample couples respectively corresponding to the N training scenes; and training an image processing model based on the training sample set.

According to a second aspect of the embodiments of the present disclosure, a method for image processing includes: acquiring M frames of long-distance shot images of a target object, M being a positive integer greater than 1; and inputting the M frames of long-distance shot images into an image processing model trained according to the method of the first aspect, as to acquire an enhanced image of the target object.

According to a third aspect of the embodiment of the present disclosure, an apparatus for training an image processing model includes: a processor; and a memory storing instructions executable by the processor, wherein the processor is configured to: for each of N training scenes, acquire M frames of long-distance shot images, both N and M being positive integers greater than 1; for each of the N training scenes, acquire a short-distance standard image of each of the N training scenes; for each of the N training scenes, clip the M frames of long-distance shot images to obtain a same field of view as that of the short-distance standard image, and align the M frames of long-distance shot images after being clipped with the short-distance standard image; form a training sample couple of each of the N training scenes by the M frames of long-distance shot images and the short-distance standard image of each of the N training scenes after alignment, and form a training sample set by N training sample couples respectively corresponding to the N training scenes; and train an image processing model based on the training sample set.

According to a fourth aspect of the embodiments of the present disclosure, a non-transitory computer-readable storage medium has stored therein instructions that, when executed by a processor of a device, cause the device to perform a method for training an image processing model. The method includes: for each of N training scenes, acquiring M frames of long-distance shot images, both N and M being positive integers greater than 1; for each of the N training scenes, acquiring a short-distance standard image; for each of the N training scenes, clipping the M frames of long-distance shot images to obtain a same field of view as that of the short-distance standard image, and aligning the M frames of long-distance shot images after being clipped with the short-distance standard image; forming a training sample couple of each of the N training scenes by the M frames of long-distance shot images and the short-distance standard image of each of the N training scenes after alignment, and forming a training sample set by N training sample couples respectively corresponding to the N training scenes; and training an image processing model based on the training sample set.

It is to be understood that the above general descriptions and detailed descriptions below are only exemplary and explanatory, and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

With the development of deep learning, a digital zooming technology based on a convolutional neural network has been more and more popular. A digital zooming method based on a convolutional neural network may use a synthetic low-resolution Red-Green-Blue (RGB) image, which may be obtained by sampling downward in a high-resolution image, as an input when constructing a training set. Such simulation of degradation through downward sampling may not reflect a real degradation situation of an image. In addition, denoising may not be achieved by the digital zooming method, and construction of an input image through downward sampling may indirectly reduce a noise level in an input, resulting in that a finally trained network does not have a good capability of denoising.

The present disclosure provides methods for training an image processing model, which can implement digital zooming and denoising of an image simultaneously. An acquired image after being zoomed, compared with the image before being zoomed, can be clearer and can be observed in more details, and noise can also be greatly reduced.

The methods may be applied to a digital camera or a smart terminal equipped with a digital camera.

Figure 1:
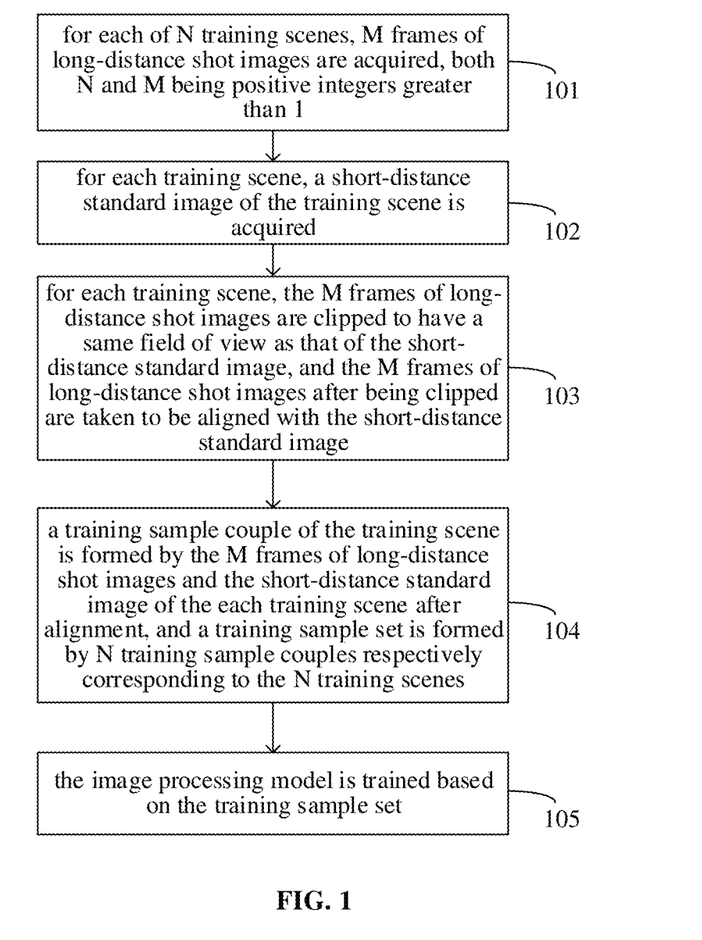
FIG. 1 is a flowchart illustrating a method for training an image processing model according to an exemplary embodiment.

FIG. 1 is a flowchart illustrating a method for training an image processing model according to an exemplary embodiment. As shown in FIG. 1, the method may include the following operations.

In operation 101, for each of N training scenes, M frames of long-distance shot images are acquired, both N and M being positive integers greater than 1.

In operation 102, for each training scene, a short-distance standard image of the training scene is acquired.

In operation 103, for each training scene, the M frames of long-distance shot images are clipped to obtain a same field of view as that of the short-distance standard image, and the M frames of long-distance shot images after being clipped are taken to be aligned with the short-distance standard image.

In operation 104, a training sample couple of the training scene is formed by the M frames of long-distance shot images and the short-distance standard image of the each training scene after alignment, and a training sample set is formed by N training sample couples respectively corresponding to the N training scenes.

In operation 105, the image processing model is trained based on the training sample set.

Figure 2:
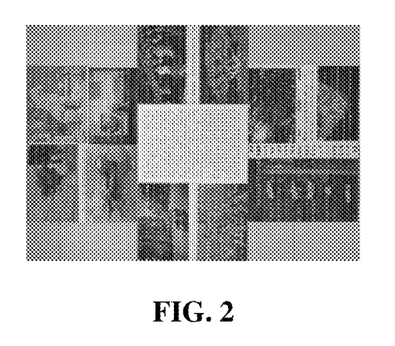
FIG. 2 shows a long-distance shot image according to an exemplary embodiment.

In the operation 101, the M frames of long-distance shot images may be captured from a same training scene through a camera fixed at a same position. For example, long-distance shot images can be captured through a process as below: a target in a scene is fixed, a camera is fixed on a tripod, and the tripod is fixed at a position which is, e.g., 4 m away from the target, and 10 images are continuously shot by the camera. FIG. 2 shows a long-distance shot image according to an exemplary embodiment. With the same shooting mode, N training scenes are shot, and M frames of long-distance shot images are shot for each training scene.

In an embodiment, N and M can be set according to an expected training effect. For example, N may be set to 500, 1000 and the like, and M may be set to 10, 20 and the like. M and N are positive integers greater than 1, namely, multiple frames of long-distance shot images may be captured for each of multiple training scenes. Digital zooming in the conventional art is often implemented on a single frame of image, however, information of a single frame of image is limited, and it is difficult to acquire an image with richer details based on only one image. Therefore, the method in the embodiment performs digital zooming on multiple frames of images, thus implementing information fusion in a grid having a higher resolution by use of complementary information of the multiple frames of images, so as to acquire an image having more details and higher resolution.

In the operation 102, the short-distance standard image of the training scene may be defined as a low-noise image at a position which is close to the training scene.

In the operation 103, the M frames of long-distance shot images of the each training scene are clipped to obtain the same field of view as that of the low-noise image, and the M frames of long-distance shot images after being clipped are taken to be aligned with the low-noise image.

It is to be noted that short-distance and long-distance shot images for acquiring a short-distance standard image are shot at different positions having different distances away from a training scene, and the field of view of the long-distance shot images are broader than that of the short-distance shot image. Therefore, the long-distance shot images need to be downsized during alignment, so as to enable the short-distance standard image and the long-distance shot image to have the same field of view. Then single mapping and alignment may be implemented based on characteristics in the images. Finally, deghosting may be implemented as well. For the same field of view, a same scene may be observed from different angles of view.

In the method, long-distance images are taken to be aligned with a short-distance image, in this way, training of an image processing model into which the aligned long-distance images have been input can be based on the long-distance images and the short-distance image. The two types of images acquired by close and remote shooting may produce different fields of view, and degradation of the fields of view can be most close to degradation of the real image. The degradation based on different fields of view can be learned through a deep learning network, in this way, the network may effectively implement digital zooming on the images shot remotely, and thus a high-definition image can be acquired. The conventional digital zooming based on a deep learning network generally constructs a data set by stimulating degradation, and the data set constructed with such a fictitious simulation may not address the degradation in a real scene.

The operation 104 is a process of forming the training sample set. The training sample couple may be constituted of data acquired from each training scene, and the training sample set may be formed by the training sample couples.

In operation 105, the image processing model, for example, the deep learning network, is trained based on the acquired training sample set.

In an embodiment, the operation of acquiring the short-distance standard image of the training scene may include: acquiring K frames of short-distance shot images of the training scene, K being a positive integer greater than or equal to 1; and acquiring the short-distance standard image of the training scene based on the K frames of short-distance shot images.

In an embodiment, the operation of acquiring the short-distance standard image of the training scene based on the K frames of short-distance shot images may include: acquiring the short-distance standard image of the training scene through multi-frame integration based on the K frames of short-distance shot images.

In an embodiment, the long-distance shot images and the short-distance shot images may be images acquired at the same horizontal level.

The above embodiments provide a method of acquiring a short-distance standard image of a training scene. The short-distance standard image may be a low-noise image acquired through processing captured images shot closely. There is a noise in the images captured by a camera. Generally, the noise is independent from other noises in space, and is an additive noise. Thus, an image captured by a camera may be represented by a composition of a noiseless image and an additive noise, as shown in a formula below:

$$G(x,y)=f(x,y)+B(x,y)$$

G(x,y) represents a captured image, f(x,y) represents a noiseless image, and B(x,y) represents a noise. For multiple images shot for a same scene, B(x,y) is generally deemed to be random and unrelated, and can meet Gaussian distribution with a mean value 0. Therefore, the noiseless image may be an expectation of the mean value of the multiple images of the same scene. Therefore, multiple frames of images may be synthesized to form a low-noise image. It can be seen from experiments that one low-noise image may be acquired based on 10 frames of images. Namely, K may be a positive integer greater than or equal to 10.

Figure 3:
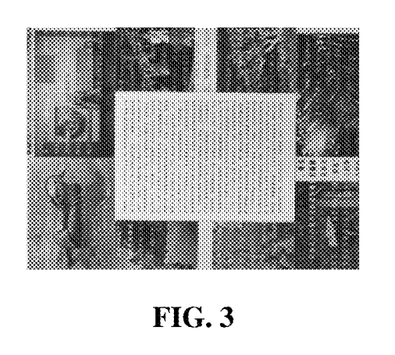
FIG. 3 shows a short-distance shot image according to an exemplary embodiment.
Figure 4:
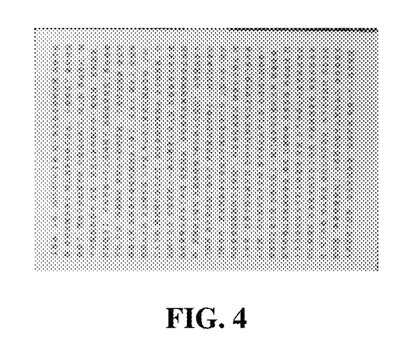
FIG. 4 shows a short-distance shot image according to an exemplary embodiment.
Figure 5:
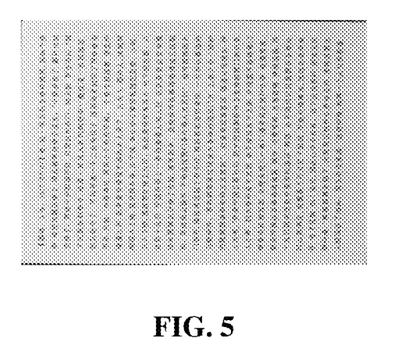
FIG. 5 shows a short-distance standard image according to an exemplary embodiment.

As an example, a target in a scene is fixed, a camera is fixed on a tripod and the tripod is fixed at a position which is 2 m away from the target, and ten target images may be continuously shot at the position which is 2 m away from the target. Here, alignment among the images can be facilitated by ensuring that the images are captured at the same horizontal level when the images are shot closely and remotely. FIG. 3 shows a short-distance shot image according to an exemplary embodiment. The ten images may be subjected to multi-frame integration to acquire one low-noise image. There are many widely used methods for multi-frame fusion and denoising methods, and the multi-frame fusion and denoising can be implemented even with Photoshop (PS). FIG. 4 and FIG. 5 show a short-distance shot image and a short-distance standard image, respectively. Here, the short-distance standard image in FIG. 5 is obtained based on multiple short-distance shot images, such as the one shown in FIG. 4, subjected to the multi-frame integration technology.

In the method, images input into an image processing model may be multiple frames of Red Green Blue (RGB) images which are acquired through remote continuous shooting and are not processed. Therefore, the images may have high color noises. Alignment may be performed on multiple images acquired by continuously and closely shooting a same scene, and then the aligned images may be subjected to multi-frame integration and denoising to obtain an image without color noises. The image processing model generally may be a deep learning network model, such degradation based on noise can be learned through the deep learning network model, in this way, the network model can effectively denoise the images which are remotely shot. Therefore, the method here can have capabilities of both digital zooming and denoising. Conventional digital zooming algorithms may not remove noise well, particularly when removing a color noise.

In an embodiment, the method may further include: selecting one frame of long-distance reference image from the M frames of long-distance shot images.

The long-distance reference image may be the clearest image among the multiple frames of long-distance shot images. The long-distance reference image may be applied to alignment of the long-distance shot images with the short-distance standard image, and the training effect of the deep learning network can be enhanced by increasing the weight of the long-distance reference image in calculation when the long-distance reference image is input into the image processing model, for example, the deep learning network model.

For example, 10 frames of aligned long-distance shot images may be input synchronously to the deep learning network model, and a length and a width thereof may be w and h, respectively. A first frame among the 10 frames of long-distance shot images may be a long-distance reference image, and each frame may be subjected to downward sampling after three convolutions to acquire three feature graphs with different sizes: w*h*c, w/2*h/2*4c, and w/4*h/4*8c, respectively, where c is the number of channels and may be 8 here. Then a multi-channel feature block w/4*h/4*8*10c can be acquired through connections among feature channels, and upward sampling can be performed on the multi-channel feature block through deconvolution after the multi-channel feature block passes multiple residual blocks. In addition, a feature corresponding to each frame may be associated with a subsequent feature with a corresponding size through multi-frame concatenation. Finally, a low-noise and high-definition image with an output w*h*3 can be obtained.

In an embodiment, the operation of selecting one frame of long-distance reference image from the M frames of long-distance shot images may include: acquiring a gradient value of each of the M frames of long-distance shot images; and selecting the long-distance shot image having a maximum gradient value as the long-distance reference image.

Figure 6:
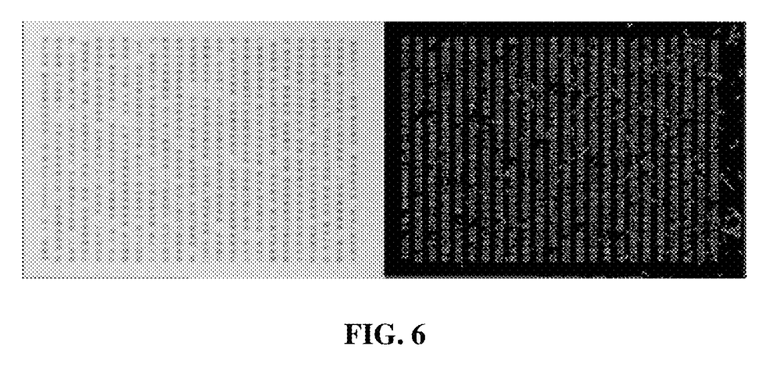
FIG. 6 is a comparison between a long-distance shot image and a gradient binary image thereof according to an exemplary embodiment.

The gradient value of the image may be acquired through a Laplace operator. A method in an existing technology may be adopted to calculate the gradient value. FIG. 6 is a diagram illustrating comparison between a frame of long-distance shot image and a gradient binary image thereof, in which the left side is a part clipped from a long-distance shot image and the right side is the gradient binary image of the clipped part.

In an embodiment, the operation of aligning the M frames of long-distance shot images after being clipped with the short-distance standard image may include: aligning the long-distance reference image with the short-distance standard image; and aligning other images in the M frames of long-distance shot images with the long-distance reference image.

Long-distance shot images are usually shot with a fixed tripod, therefore the long-distance shot images are not aligned with each other, for example, because there may be a moving object in the scene, such as a leave flutters and the like. In a case that a clearest image is selected from the long-distance shot images as a long-distance reference image, the long-distance reference image may be taken to be aligned with a short-distance standard image, and then other long-distance shot images may be taken to be aligned with the long-distance reference image. Namely, other long-distance shot images may be clipped to have a same field of view as the long-distance reference image, and then a local block which is not aligned may be eliminated with a deghosting technology, as to acquire the aligned long-distance shot images.

In some embodiments, a better alignment effect can be achieved by aligning the long-distance shot images with the long-distance reference image.

In an embodiment, the operation of training the image processing model based on the training sample set may include: setting the weight of the long-distance reference image in calculation to be greater than that of the other images in the M frames of long-distance shot images in the image processing model.

As an example, the long-distance reference image may be taken as the first frame in the long-distance shot images and input into the image processing model, for example, the deep learning network model. Since the long-distance reference image is the clearest image in the long-distance shot images, training of the deep learning network model can be enhanced by setting the long-distance reference image to have a higher calculation weight. In this way, an output image of the deep learning network model can be clearer.

Figure 7:
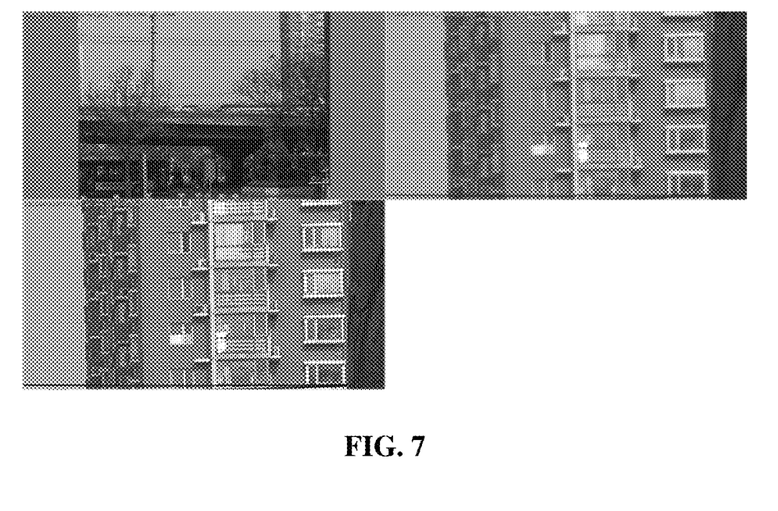
FIG. 7 shows an image processing effect of an image processing model according to an exemplary embodiment.

After training of the deep learning network model is completed, multiple frames of long-distance shot images may be input into the deep learning network model, in this way, the deep learning network model can output a partial high-definition image of the long-distance shot image. FIG. 7 shows an image processing effect of a deep learning network model according to an exemplary embodiment. An upper left part is a long-distance shot image, and an upper right part is a partial image in the long-distance shot image. It can be seen from FIG. 7 that the partial image is fuzzy. A lower left part is a partial image after being processed by the trained deep learning network model, and the partial image is clearer.

In an embodiment, the image processing model may be a multi-frame super-resolution network model.

Figure 8:
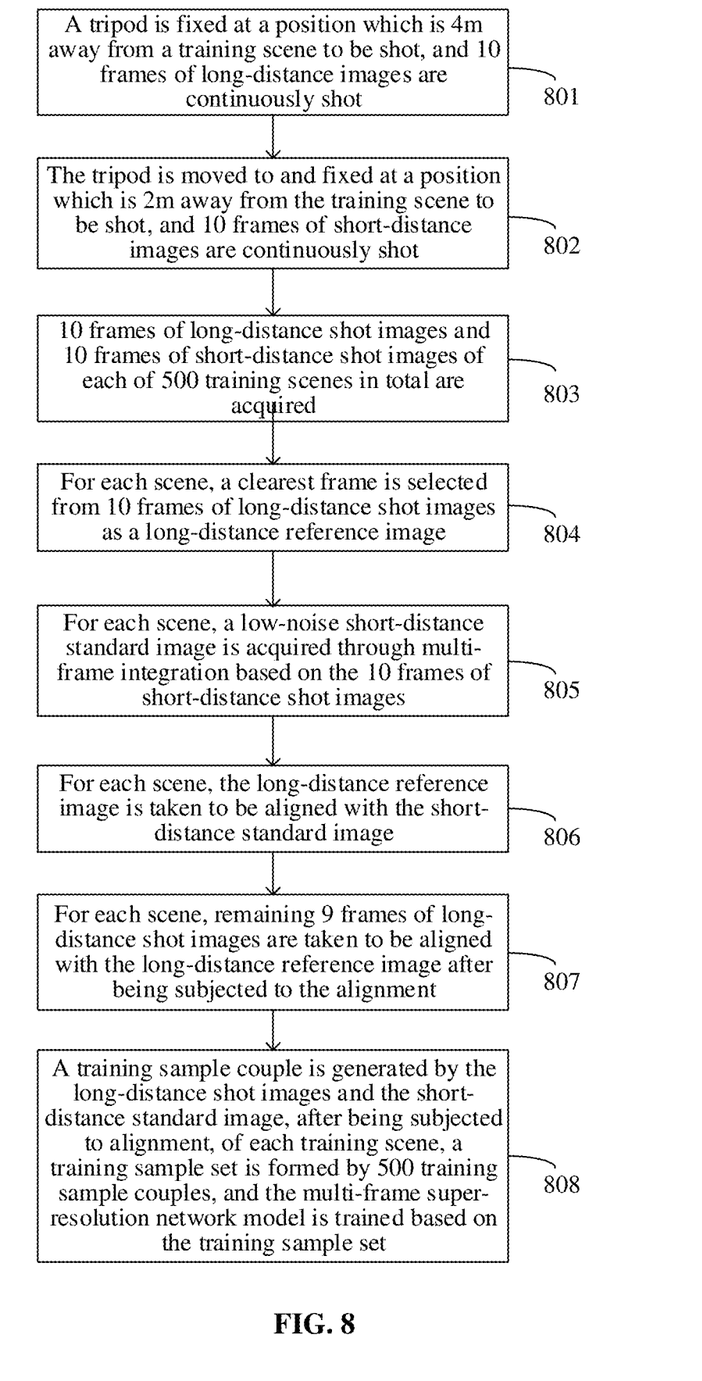
FIG. 8 is a flowchart illustrating a method for training an image processing model according to an exemplary embodiment.

FIG. 8 is a flow chart of a method for training an image processing model according to an exemplary embodiment, in which the image processing model is a multi-frame super-resolution network model. As shown in FIG. 8, the method may include the following operations.

In operation 801, a tripod is fixed at a position which is a predetermined distance, e.g., 4 m, away from a training scene to be shot, a camera is fixed on the tripod, and a predetermined number of frames, e.g., 10 frames, of long-distance images are continuously shot.

In operation 802, the tripod is moved to and fixed at a position which is a predetermined distance, e.g., 2 m, away from the training scene to be shot, the camera is fixed on the tripod, and 10 frames of short-distance images are continuously shot.

In operation 803, the operation 801 and the operation 802 are repeated, to acquire 10 frames of long-distance shot images and 10 frames of short-distance shot images of each of 500 training scenes in total.

In operation 804, for each scene, a clearest frame is selected from 10 frames of long-distance shot images as a long-distance reference image.

In operation 805, for each scene, a low-noise short-distance standard image is acquired through multi-frame integration based on 10 frames of short-distance shot images.

Figure 9:
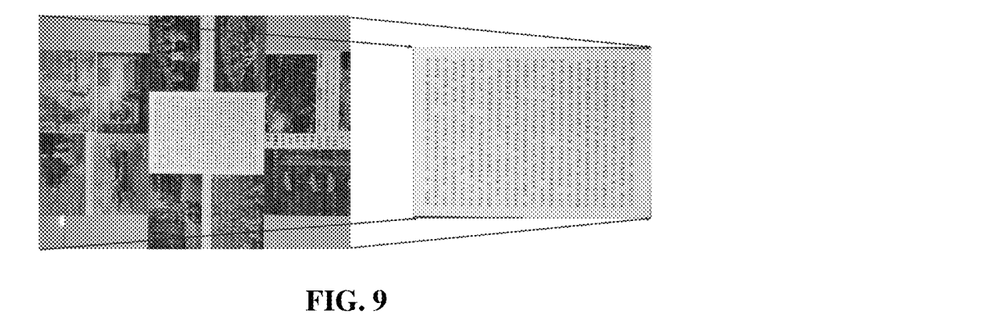
FIG. 9 is a schematic diagram illustrating clipping of a short-distance standard image according to an exemplary embodiment.
Figure 10:
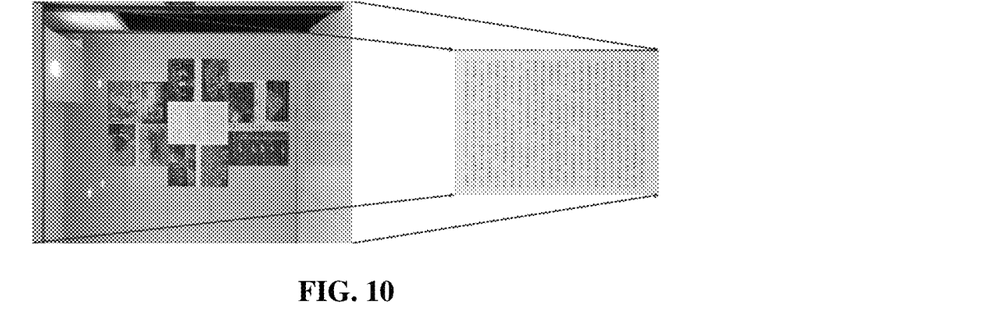
FIG. 10 is a schematic diagram illustrating clipping of a long-distance reference image according to an exemplary embodiment.
Figure 11:
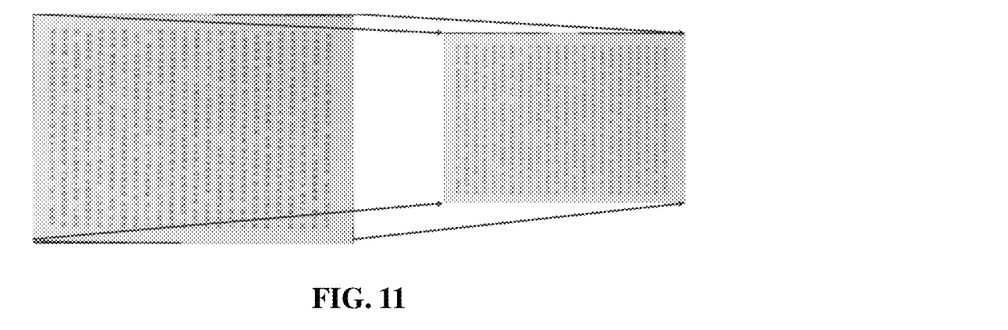
FIG. 11 is a schematic diagram illustrating alignment of a clipped long-distance reference image with a short-distance standard image according to an exemplary embodiment.
Figure 12:
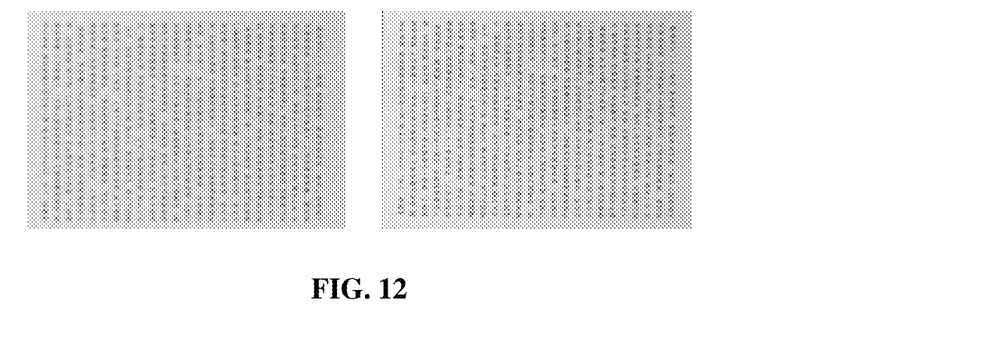
FIG. 12 shows an image obtained after deghosting of a long-distance reference image and a short-distance standard image which are aligned according to an exemplary embodiment.

In operation 806, for each scene, the long-distance reference image is taken to be aligned with the short-distance standard image, For example, the short-distance standard image is clipped as shown in FIG. 9, the long-distance reference image is clipped as shown in FIG. 10 as to get a same field of view as that of the short-distance standard image after being clipped, the long-distance reference image after being clipped is taken to be aligned with the short-distance standard image as shown in FIG. 11, and the long-distance reference image and the short-distance standard image that are aligned are subjected to deghosting to obtain an image as shown in FIG. 12.

Figure 13:
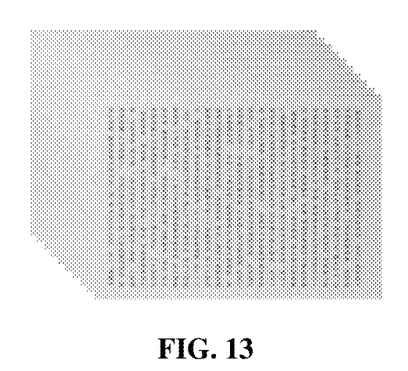
FIG. 13 is a schematic diagram illustrating 10 frames of long-distance shot images after alignment according to an exemplary embodiment.

In operation 807, for each scene, remaining 9 frames of long-distance shot images are taken to be aligned with the long-distance reference image after being subjected to the alignment, similar to the alignment in the operation 806, and the acquired 10 frames of aligned long-distance shot images are shown in FIG. 13.

In operation 808, a training sample couple is generated by the long-distance shot images and the short-distance standard image, after being subjected to alignment, of each training scene; a training sample set is formed by 500 training sample couples, and the multi-frame super-resolution network model is trained based on the training sample set.

In an embodiment, a method for image processing may include: acquiring M frames of long-distance shot images of a target object, M being a positive integer greater than 1; and inputting the M frames of long-distance shot images into an image processing model trained according to the above described method for training an image processing model, to acquire an enhanced image of the target object.

For example, 10 frames of long-distance shot images of the target object may be captured, and a clearest frame may be selected, for example, based on a gradient value of the image, from the 10 frames of long-distance shot images as a long-distance reference image. Other 9 frames of long-distance shot images may be taken to be aligned with the long-distance reference image, and the 10 frames of aligned long-distance shot images may be input into the trained image processing model, and a clear image of the target object can be acquired after being processed by the model.

Figure 14:
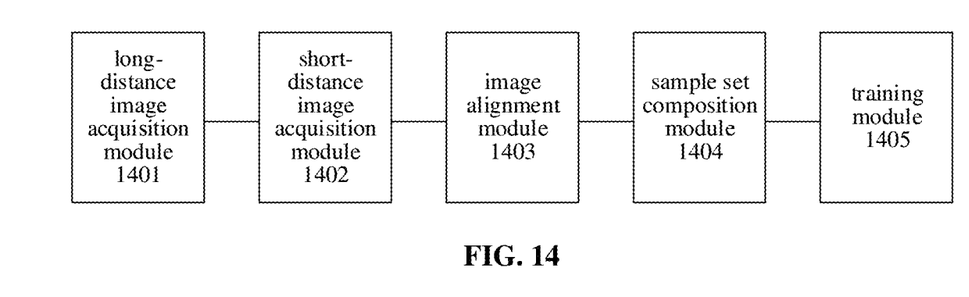
FIG. 14 is a block diagram illustrating an apparatus for training an image processing model according to an exemplary embodiment.

FIG. 14 is a block diagram of an apparatus for training an image processing model, according to an exemplary embodiment. As shown in FIG. 14, the apparatus may include: a long-distance image acquisition module 1401 configured to, for each of N training scenes, acquire M frames of long-distance shot images, both N and M being positive integers greater than 1; a short-distance image acquisition module 1402 configured to, for the each training scene, acquire a short-distance standard image of the training scene; an image alignment module 1403 configured to, for the each training scene, clip the M frames of long-distance shot images to obtain a same field of view as that of the short-distance standard image, and align the M frames of long-distance shot images after being clipped with the short-distance standard image; a sample set composition module 1404 configured to form a training sample couple of the each training scene by the M frames of long-distance shot images and the short-distance standard image of the each training scene after alignment, and form a training sample set by N training sample couples respectively corresponding to the N training scenes; and a training module 1405 configured to train the image processing model based on the training sample set.

Specific manners of each module implementing operations therein have been described above in detail in the method embodiments.

The image processing model may be trained by clipping long-distance shot images and aligning the clipped long-distance shot images with a short-distance standard image obtained based on short-distance shot images and by taking multiple frames of aligned long-distance shot images as an input and taking the short-distance standard image as an output. By adopting the image processing model trained through the above described method to process long-distance shot images, a digital zooming effect is effectively improved and denoising is achieved. With the method in the embodiments of the present disclosure, a user can see a character or other objects at a remote distance more clearly when shooting.

Figure 15:
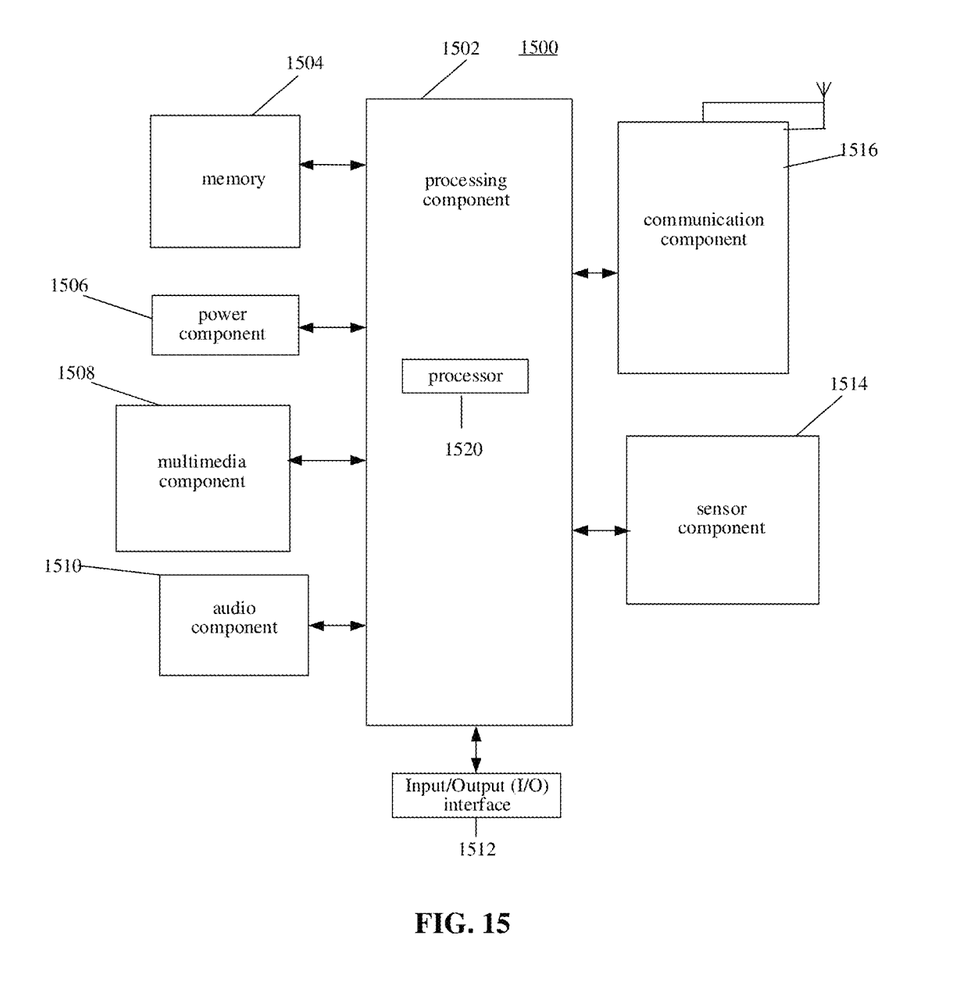
FIG. 15 is a block diagram illustrating an apparatus according to an exemplary embodiment.

FIG. 15 is a block diagram illustrating an apparatus 1500 for training an image processing model according to an exemplary embodiment. For example, the apparatus 1500 may be a mobile phone, a computer, a digital broadcast terminal, a messaging device, a gaming console, a tablet, a medical device, exercise equipment and a personal digital assistant.

Referring to FIG. 15, the apparatus 1500 may include one or more of the following components: a processing component 1502, a memory 1504, a power component 1506, a multimedia component 1508, an audio component 1510, an Input/Output (I/O) interface 1512, a sensor component 1514, a communication component 1516, and a camera component for capturing images (not shown in the figures).

The processing component 1502 is typically configured to control overall operations of the apparatus 1500, such as the operations associated with display, telephone calls, data communications, camera operations, and recording operations. The processing component 1502 may include one or more processors 1502 to execute instructions to perform all or part of the operations in the above-mentioned method. Moreover, the processing component 1502 may include one or more modules which facilitate interaction between the processing component 1502 and other components. For example, the processing component 1502 may include a multimedia module, as to facilitate interaction between the multimedia component 1508 and the processing component 1502.

The memory 1504 is configured to store various types of data to support the operation of the apparatus 1500. Examples of such data may include instructions for any application programs or methods operated on the apparatus 1500, contact data, phonebook data, messages, pictures, video, etc. The memory 1504 may be achieved by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or an optical disk.

The power component 1506 is configured to provide power for various components of the apparatus 1500. The power component 1506 may include a power management system, one or more power supplies, and other components associated with generation, management and distribution of power for the apparatus 1500.

The multimedia component 1508 may include a screen for providing an output interface between the apparatus 1500 and a user. In some embodiments, the screen may include a Liquid Crystal Display (LCD) and a Touch Panel (TP). If the screen includes the TP, the screen may be achieved as a touch screen to receive an input signal from the user. The TP may include one or more touch sensors to sense touches, swipes and gestures on the TP. The touch sensors may not only sense a boundary of a touch or swipe action but also detect a duration and pressure associated with the touch or swipe action. In some embodiments, the multimedia component 1508 may include a front camera and/or a rear camera. The front camera and/or the rear camera may receive external multimedia data when the apparatus 1500 is in an operation mode, such as a shooting mode or a video mode. Each of the front camera and the rear camera may be a fixed optical lens system or have focusing and optical zooming capabilities.

The audio component 1510 is configured to output and/or input an audio signal. For example, the audio component 1510 may include a Microphone (MIC), and the MIC is configured to receive an external audio signal when the apparatus 1500 is in the operation mode, such as a call mode, a recording mode and a voice recognition mode. The received audio signal may further be stored in the memory 1504 or sent through the communication component 1516. In some embodiments, the audio component 1510 may further include a speaker configured to output the audio signal.

The I/O interface 1512 is configured to provide an interface between the processing component 1502 and a peripheral interface module, and the peripheral interface module may be a keyboard, a click wheel, a button and the like. The button may include, but not limited to: a home button, a volume button, a starting button and a locking button.

The sensor component 1514 may include one or more sensors configured to provide status assessment in various aspects for the apparatus 1500. For example, the sensor component 1514 may detect an on/off status of the apparatus 1500 and relative positioning of components, such as a display and small keyboard of the apparatus 1500, and the sensor component 1514 may further detect a change in a position of the apparatus 1500 or a component of the apparatus 1500, presence or absence of contact between the user and the apparatus 1500, orientation or acceleration/deceleration of the apparatus 1500 and a change in temperature of the apparatus 1500. The sensor component 1514 may include a proximity sensor configured to detect presence of an object nearby without any physical contact. The sensor component 1514 may further include a light sensor, such as a Complementary Metal Oxide Semiconductor (CMOS) or Charge Coupled Device (CCD) image sensor, configured for use in an imaging application. In some embodiments, the sensor component 1514 may further include an acceleration sensor, a gyroscope sensor, a magnetic sensor, a pressure sensor or a temperature sensor.

The communication component 1516 is configured to facilitate wired or wireless communication between the apparatus 1500 and another device. The apparatus 1500 may access to a communication-standard-based wireless network, such as a Wireless Fidelity (WiFi) network, a 4th-Generation (4G) or 5th-Generation (5G) network or a combination thereof. In an exemplary embodiment, the communication component 1516 receives a broadcast signal or broadcast associated information from an external broadcast management system through a broadcast channel. In an exemplary embodiment, the communication component 1516 may further include a Near Field Communication (NFC) module to facilitate short-range communication. In an exemplary embodiment, the communication component 1516 may be implemented based on a Radio Frequency Identification (RFID) technology, an Infrared Data Association (IrDA) technology, an Ultra-WideB and (UWB) technology, a Bluetooth (BT) technology and other technology.

In an exemplary embodiment, the apparatus 1500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above-mentioned method.

In an exemplary embodiment, there is also provided a non-transitory computer-readable storage medium including instructions, such as the memory 1504 including instructions, and the instructions may be executed by the processor 1520 of the apparatus 1500 to perform the above described methods. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device and the like.

There is also provided a non-transitory computer-readable storage medium. Instructions in the storage medium, when executed by a processor of a mobile terminal, can cause the mobile terminal to execute a method for training an image processing module, and the method may include: for each of N training scenes, acquiring M frames of long-distance shot images, both N and M being positive integers greater than 1; for the each training scene, acquiring a short-distance standard image of the training scene; for the each training scene, clipping the M frames of long-distance shot images to obtain a same field of view as that of the short-distance standard image, and taking the M frames of long-distance shot images after being clipped to be aligned with the short-distance standard image; forming a training sample couple of the each training scene by the M frames of long-distance shot images and the short-distance standard image of the each training scene after alignment, and forming a training sample set by N training sample couples respectively corresponding to the N training scenes; and training the image processing model based on the training sample set.

Figure 16:
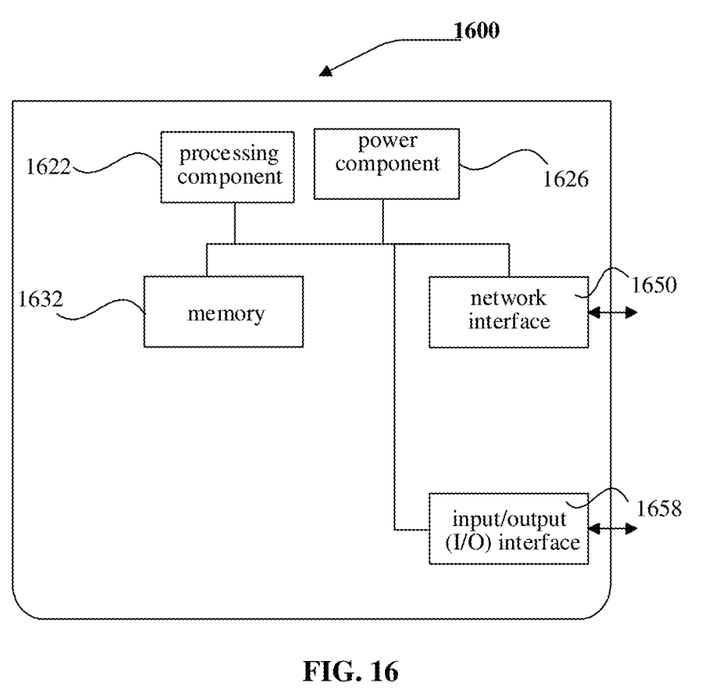
FIG. 16 is a block diagram illustrating an apparatus according to an exemplary embodiment.

FIG. 16 is a block diagram illustrating a deep learning network training apparatus 1600 for image processing according to an exemplary embodiment. For example, the apparatus 1600 may be provided as a server. Referring to FIG. 16, the apparatus 1600 may include a processing component 1622, which further includes one or more processors, and a memory resource represented by a memory 1632, configured to store instructions executable by the processing component 1622, for example, an application program. The application program stored in the memory 1632 may include one or more modules each corresponding to a set of instructions. In addition, the processing component 1622 is configured to execute the instructions, as to perform the above described methods: for each of N training scenes, acquiring M frames of long-distance shot images, both N and M being positive integers greater than 1; for the each training scene, acquiring a short-distance standard image of the training scene; for the each training scene, clipping the M frames of long-distance shot images to obtain a same field of view as that of the short-distance standard image, and taking the M frames of long-distance shot images after being clipped to be aligned with the short-distance standard image; forming a training sample couple of the each training scene by the M frames of long-distance shot images and the short-distance standard image of the each training scene after alignment, and forming a training sample set by N training sample couples respectively corresponding to the N training scenes; and training an image processing model based on the training sample set.

The apparatus 1600 may further include a power component 1626 configured to execute power management of the apparatus 1600, a wired or wireless network interface 1650 configured to connect the apparatus 1600 to a network and an input/output (I/O) interface 1658. The apparatus 1600 may be operated based on an operating system stored in the memory 1632, for example, Windows Server™, Mac OS X™, Unix™, Linux™, FreeBSD™ or the like.

Other implementations of the present disclosure will be apparent to those skilled in the art from consideration of the specification and practice of the present disclosure. The present disclosure is intended to cover any variations, uses, or adaptations of the present disclosure following the general principles thereof and including such departures from the present disclosure as come within known or customary practice in the art. It is intended that the embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for training an image processing model, comprising:
    for each of N training scenes, acquiring M frames of long-distance shot images, wherein both N and M are positive integers greater than 1;
    for each of the N training scenes, acquiring a short-distance standard image of each of the N training scenes;

for each of the N training scenes, clipping the M frames of long-distance shot images to obtain a same field of view as that of the short-distance standard image, and aligning the M frames of long-distance shot images after being clipped with the short-distance standard image;

for each of the N training scenes, forming a training sample couple by the M frames of long-distance shot images and the short-distance standard image after alignment;

forming a training sample set by N training sample couples respectively corresponding to the N training scenes; and training an image processing model based on the training sample set by setting a calculation weight of a long-distance reference image to be greater than calculation weights of other images in the M frames of long-distance shot images in the image processing model, wherein the long-distance reference image is a clearest image selected from the M frames of long-distance shot images.

2. The method of claim 1, wherein acquiring the short-distance standard image of each of the N training scenes comprises:
  acquiring K frames of short-distance shot images of each of the N training scenes, wherein K is a positive integer greater than or equal to 1; and
  acquiring the short-distance standard image of each of the N training scenes based on the K frames of short-distance shot images.

3. The method of claim 2, wherein acquiring the short-distance standard image of each of the N training scenes based on the K frames of short-distance shot images comprises:
  acquiring the short-distance standard image of each of the N training scenes through multi-frame integration based on the K frames of short-distance shot images.

4. The method of claim 2, further comprising:
  acquiring short-distance shot images and the long-distance shot images at a same horizontal level.

5. The method of claim 1, further comprising:
  selecting, from the M frames of long-distance shot images, one frame as the long-distance reference image.

6. The method of claim 5, wherein aligning the M frames of long-distance shot images after being clipped with the short-distance standard image comprises:
  aligning the long-distance reference image with the short-distance standard image; and
  aligning other images in the M frames of long-distance reference images with the long-distance reference image.

7. The method of claim 5, wherein selecting, from the M frames of long-distance shot images, one frame as the long-distance reference image comprises:
  acquiring a gradient value of each of the M frames of long-distance shot images; and
  selecting a long-distance shot image having a maximum gradient value as the long-distance reference image.

8. The method of claim 1, wherein the image processing model is a multi-frame super-resolution network model.

9. A method for image processing, comprising:
  acquiring M frames of long-distance shot images of a target object, wherein M is a positive integer greater than 1; and
  inputting the M frames of long-distance shot images into an image processing model to acquire an enhanced image of the target object;
  wherein the image processing model is trained by:
    for each of N training scenes, acquiring M frames of long-distance shot images, wherein both N and M are positive integers greater than 1;
    for each of the N training scenes, acquiring a short-distance standard image of each of the N training scenes;
    for each of the N training scenes, clipping the M frames of long-distance shot images to obtain a same field of view as the short-distance standard image, and aligning the M frames of long-distance shot images after being clipped with the short-distance standard image;
    for each of the N training scenes, forming a training sample couple by the M frames of long-distance shot images and the short-distance standard image after alignment;
    forming a training sample set by N training sample couples respectively corresponding to the N training scenes; and
    training an image processing model based on the training sample set by setting a calculation weight of a long-distance reference image to be greater than calculation weights of other images in the M frames of long-distance shot images in the image processing model, wherein the long-distance reference image is a clearest image selected from the M frames of long-distance shot images.

10. An apparatus for training an image processing model, comprising:
  a processor; and
  a memory storing instructions executable by the processor,
  wherein the processor is configured to:
    for each of N training scenes, acquire M frames of long-distance shot images, wherein both N and M are positive integers greater than 1;
    for each of the N training scenes, acquire a short-distance standard image of each of the N training scenes;
    for each of the N training scenes, clip the M frames of long-distance shot images to obtain a same field of view as the short-distance standard image, and align the M frames of long-distance shot images after being clipped with the short-distance standard image;
    form a training sample couple of each of the N training scenes by the M frames of long-distance shot images and the short-distance standard image of after alignment, and form a training sample set by N training sample couples respectively corresponding to the N training scenes; and
    train an image processing model based on the training sample set by setting a calculation weight of a long-distance reference image to be greater than calculation weights of other images in the M frames of long-distance shot images in the image processing model, wherein the long-distance reference image is a clearest image selected from the M frames of long-distance shot images.

11. The apparatus of claim 10, wherein the processor is further configured to:

acquire K frames of short-distance shot images of each of the N training scenes, wherein K is a positive integer greater than or equal to 1; and acquire the short-distance standard image of each of the N training scenes based on the K frames of short-distance shot images.

12. The apparatus of claim 11, wherein the processor is further configured to:

acquire the short-distance standard image of each of the N training scenes through multi-frame integration based on the K frames of short-distance shot images.

13. The apparatus of claim 11, wherein the processor is further configured to:

acquire short-distance shot images and the long-distance shot images at a same horizontal level.

14. The apparatus of claim 10, wherein the processor is further configured to:

select, from the M frames of long-distance shot images, one frame as the long-distance reference image.

15. The apparatus of claim 14, wherein the processor is further configured to:

align the long-distance reference image with the short-distance standard image; and align other images in the M frames of long-distance reference images with the long-distance standard image.

16. The apparatus of claim 14, wherein the processor is further configured to:

acquire a gradient value of each of the M frames of long-distance shot images; and select a long-distance shot image having a maximum gradient value as the long-distance reference image.

17. The apparatus of claim 10, wherein the image processing model is a multi-frame super-resolution network model.

18. A terminal, comprising:

a processor; and a memory for storing instructions executable by the processor;

wherein the processor is configured to perform the method of claim 9.

* * * * *